Feb. 26, 1952
E. O. KEIZER
2,586,957
GATED AMPLIFIER CIRCUIT
Filed Oct. 2, 1950
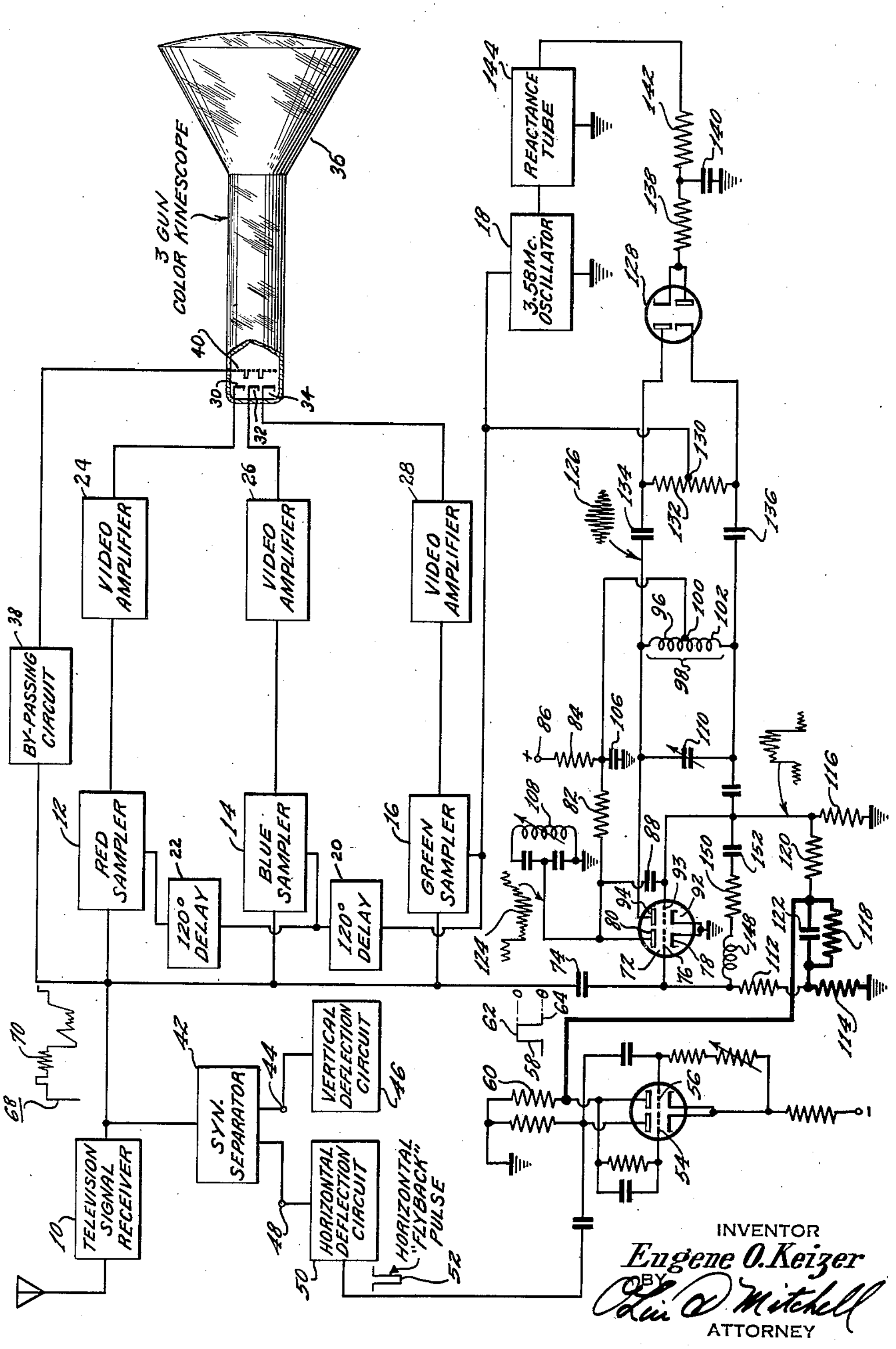
INVENTOR
Eugene O. Keizer
BY
Lin D. Mitchell
ATTORNEY Patented Feb. 26, 1952

2,586,957

UNITED STATES PATENT OFFICE 2,586,957

GATED AMPLIFIER CIRCUIT

Eugene O. Keizer, Princeton, N. J., assignor to Radio Corporation of America, a corporation of Delaware Application October 2, 1950, Serial No. 187,934

11 Claims. (Cl. 250—27)

The present invention relates to improvements in signal gating circuits sometimes referred to as electronic switches or electrical signal sampling circuits.

In more particularity, although not necessarily exclusively, the present invention is involved with the provision of a novel signal gating circuit which involves the use of triode amplifier tubes in which both the signal to be gated and the electrical gating control signal are applied to the control electrode of the triode.

In many types of electrical equipment it is found expedient to use a gated type of amplifying circuit such, as for example, the electronic sampler or electronic switch. Such an amplifier circuit is generally provided with two input terminals, one adapted to receive intelligence signals and the other adapted to receive a control signal. It is the function of the control signal to turn the amplifier on and off so that it may pass only selected portions of the intelligence signals. In order to obtain more perfect gating action use is sometimes made of two or more gated amplifier switches connected in cascade. The gating or control signal being applied to all stages simultaneously to turn them on or off as may be required while the intelligence is circuited in normal cascade amplifier fashion.

Perhaps no greater need exists for a simple and effective gated amplifier than in present day systems of dot multiplex color television receiver synchronization. A thorough description of the use and place of gated amplifiers in such a color television receiving system is presented in a pamphlet entitled "Recent Developments in Color Synchronization in the RCA Color Television System," by the RCA Laboratories Division of the Radio Corporation of America and dated February 1950. It is there described that the horizontal synchronizing pulses of the received dot multiplex color signal will have attached on their back porches a burst of several cycles of the multiplexing frequency which, by way of example, may be in the neighborhood of 3.6 megacycles. Gating means are then provided in the receiver for sampling and extracting from the incoming signal these bursts of the dot multiplexing frequency.

The separated burst is then fed to a frequency comparison circuit which maintains a local oscillator in the receiver at the proper frequency and phase for synchronously conducting well-known dot multiplex demodulation of the incoming signal.

Experimentation with gating circuits suitable for use in extracting the burst component from the aforedescribed dot multiplex color television signal has led to the conclusion that it is highly desirable to use a triode type amplifier tube as the gated amplifier. This is because of the lower plate resistance of the triode compared to other type electronic vacuum tubes. This lower plate resistance allows a high "Q" tuned circuit to be associated with the output of the amplifier in such a way that the low plate resistance of the triode reduces the effective "Q" of the tuned circuit and allows quick build up of the burst frequency across the circuit during the "on" time of the amplifier, while allowing high "Q" damped oscillation of a relatively long duration in the tuned circuit after the triode amplifier gate has been cut off.

Accordingly, it is found desirable to apply both the signal to be gated or sampled and the gate control signal to the control electrode of the triode amplifier with sufficient negative bias on the control electrode to maintain the tube at static plate current cut off in the absence of gate signal. It has been found further desirable to arrange circuit conditions such that the control electrode or grid of the triode is driven positive with respect to the cathode of the triode during the gating interval. This has a limiting or flattening effect on the gating pulse, as is commonly used, and renders the gating action much sharper and cleaner. A further effect of allowing the grid of the triode to swing into grid current conduction, corresponding to zero bias potential between grid and cathode, is to insure the realization of the maximum mutual conductance from the triode during its "on" or gated interval.

This driving of the grid into conduction by the gating pulse, although preferred for the reasons cited above, has in the past been troublesome since it causes the grid-cathode path of the triode to appear as a very low resistance load to the source supplying the intelligence signal to be gated or sampled. Thus at the very time when the triode is enabled by the gating pulse to operate as an amplifier, prior art arrangements have suffered a decrease in the amplitude of applied intelligence signal due to the above mentioned loading effects of grid current conduction. This effect becomes more pronounced the higher the impedance of the intelligence signal source.

It is therefore an object of the present invention to provide a triode type gated amplifier in which the above noted disadvantages have been substantially overcome.

Another object of the present invention resides in the provision of a gated type triode amplifier in which both the signal to be gated and the gating pulse are simultaneously applied to the control electrode of the triode with the gating pulse being of sufficient positive going amplitude to maintain grid current conduction in the triode.

Another object of the present invention is to provide an improved signal gating circuit which is both economical and efficient and which imposes negligible loading on the source of the signal to be gated.

In the realization of the above objects and features of advantage the present invention contemplates the use of a triode amplifier stage which has applied between its control electrode and cathode a negative grid biasing potential which is slightly below the maximum peak amplitude of the positive going gating pulse applied to the control electrode. A high resistance is then imposed on the control electrode-cathode circuit so that a minimum of grid current is required to accomplish additional negative biasing of the control electrode to a value just equal to the peak to peak amplitude of the gating signal. It is further desirable in accordance with the present invention that the source of voltage used for initially biasing the control electrode negatively with respect to the cathode, display an output voltage which is a direct function of the peak to peak amplitude of the gating signal so that undesired variations in the amplitude of the gating signal will not produce erratic results in the gating action of the discharge tube. Under such conditions the intelligence signal may be capacitively coupled to the control electrode such that the loading effect of the grid-cathode path of the electron tube during conduction, is held at a minimum. If the information separated from the intelligence signal is of a fixed frequency nature a high "Q" tuned circuit may be connected with the output of the triode amplifier for the purpose of accentuating this single frequency component extracted from the intelligence signal.

A better understanding of the present invention as well as an appreciation of its other objects and features of advantage may be obtained from a reading of the following description especially when considered in connection with the accompanying single figure of the drawing in which is shown a combination block and schematic diagram of a dot multiplex color television receiving system in which the present invention finds ready application.

Turning now to the single figure, there is indicated at 10 some form of television signal receiver suitable for the reception and demodulation of dot multiplex color television signal having a burst synchronizing component. Suitable circuitry for this purpose is illustrated and described in another pamphlet entitled "A Simplified Receiver for the RCA Color Television System," dated February, 1950 and issued by the RCA Laboratories Division of the Radio Corporation of America. The output of the receiver is, as further described in the latter referenced pamphlet, coupled to the input of three sampler circuits 12, 14 and 16, respectively designated as the red, blue and green samplers. These samplers are nothing more than special forms of gated amplifiers with which the present invention is not necessarily concerned but may be applied thereto. Suitable circuitry for these samplers is described in the latter referred to pamphlet.

By way of example, a 3.58 megacycle oscillator at 18 is indicated as a source of gating or sampling signal for the sampler circuits 12, 14 and 16. The 120 degree phase shifting networks 20 and 22 provide the necessary staggering of the sampling conducted by the samplers. The outputs of the samplers 12, 14 and 16 are respectively coupled to corresponding video amplifiers 24, 26 and 28. The outputs of the amplifiers are, in turn, connected to the cathodes 30, 32 and 34 of a three-gun color kinescope 36 also described in the latter referred to article. A by-passing circuit 38 is also indicated in the figure for by-passing a desired color television signal component around the sampling stages and applying it to the grids 40 of the color kinescope 36.

The ouput of the television receiver 10 is also applied to a conventional sync separator circuit 42 which separates vertical and horizontal synchronizing signal information from the incoming color television signal. A suitable circuit arrangement for this function is disclosed by way of U. S. Patent Ser. No. 2,207,775 by A. V. Bedford, July 16, 1940. The separated vertical sync pulses appearing at terminal 44 of the sync separator are conventionally applied to the vertical deflection circuit 46 while the horizontal synchronizing pulses appearing at terminal 48 of the sync separator are applied to the horizontal deflection circuit 50. Suitable vertical and horizontal deflection circuits for this purpose are shown in an article entitled "Television Receivers," by Antony R. Wright appearing in the March 1947 issue of the RCA Review. As described in the above RCA Review article, there appears at the output of the horizontal deflection circuit a horizontal fly-back pulse which by way of example has been illustrated in the drawings at 52 and is considered as extending in the negative going direction.

The horizontal fly-back pulse 52 is then utilized to synchronize a square wave generating circuit based upon the discharge tubes 54 and 56. The square wave circuit is of Eccles-Jordan type as described in detail on pages 171 through 176 of a book entitled "Ultra High Frequency Techniques," by Brainard, Koehler, Reich and Woodruff and published by D. Van Nostrand Co., Inc. in 1942. Such a square wave generating circuit is common-place and well-known in the art and since it forms no part of the present invention a detailed description of its operation will be omitted. It is well-known that the right-hand triode 56 of the circuit is periodically rendered conducting and non-conducting to form the square wave 58. This square wave 58 is then used by the present invention as a keying pulse for the gated amplifier about to be described. It is noted that due to the connection of the anode of triode 56 to ground potential through resistor 60, the peak 62 of the square wave 58 goes no higher than ground potential or zero volts. This peak voltage represents non-conduction in the triode 56. The negative going extremity 64 of the square wave 58 of course represents maximum conduction in the discharge tube 56 and represents some D. C. potential which is negative with respect to ground.

As described in the above referenced pamphlet entitled "A Simplified Receiver for the RCA Color Television System" it is necessary to control the 3.58 mc. oscillator 18 in accordance with the burst component of the received color television signal. As stated above, this burst component appears on the back porch of the horizontal synchronizing pulse. This arrangement is shown in the figure at 68. The horizontal sync pulse 68 has a 3.58 mc. burst component at 70 situated on the back porch of the horizontal sync. As further described by the last referred to pamphlet, it is necessary to separate the burst component 70 from the received color television signal. This is accomplished by means of the triode discharge tube shown at 72.

In accordance with the arrangement shown in the figure, the color television signal appearing at the output of the receiver 10 is coupled by a capacitor 74 to the grid 76 of the left hand triode section 72. The anode 80 of the triode section 72 is supplied with polarizing potential through resistors 82 and 84 from the positive B power supply terminal at 86. Voltage variations on the anode 80 are coupled via capacitor 88 to the control electrode or grid of right hand triode section 92. Positive polarizing potential for the anode 94 of the triode 92 is supplied through the upper section 96 of inductance 98 whose tap 100 is connected with the right hand terminal of resistor 82. The voltage appearing across the second section 102 of the inductance 98 will of course be in phase with the voltage appearing across the upper section 96 so that with respect to the terminal 100 a push-pull signal appears across the inductance. Terminal 100 is effectively at A. C. ground potential by merit of the capacitor 106. To accentuate the response of the gated stage to the desired burst frequency, a tuned circuit 108 is connected in shunt with the anode circuit of the first triode 72. The output circuit of triode 92 is similarly made resonant at the burst frequency by means of a variable capacitor 110. The grid 76 of the triode 72 is connected with ground through resistors 112 and 114 while the grid of triode 92 is connected with ground through resistor 116.

In accordance with the invention the gating pulse 58 is applied to the junction of the resistors 118 and 120. A capacitor 122 shunts at least a portion of the resistor 118. The novel manner in which the gating pulse 58 is applied to the grids 76 and 93 of the triodes 72 and 92 so as to also permit the simultaneous application to these grids of intelligence signal, forms an important aspect of the present invention. The remaining circuitries shown in the figure, as will be more fully discussed hereinafter, forms the subject matter of my copending U. S. Patent application, Ser. No. 187,933, entitled "Signal Amplifying Systems," filed October 2, 1950.

The operation of the gating pulse circuit arrangement shown in the figure is substantially as follows: The values of resistors 114 and 118 are in accordance with the present invention so proportioned that the D. C. potential appearing at their junction is of a value with respect to ground slightly less than the peak to peak amplitude of the keying pulse 58. Since the capacitor 122 which by-passes the resistor 118, offers little impedance to the gating pulse 58, the gating pulse appearing at the upper terminal of resistor 114 will be almost the same amplitude as the gating pulse 58. Circuit capacitive effects will, of course, reduce the amplitude of the gating pulse appearing across resistor 114 to some degree. Since the grid 76 of the left hand triode is connected by way of resistor 112 to the upper terminal of resistor 114 it is clear that grid current will flow through resistor 112 only in an amount proportional to the differential between the peak to peak value of the gating signal appearing at resistor 114 and the value of the voltage drop across resistor 114. The voltage drop across resistor 114 is of course in the negative biasing direction for grid 76 due to the fact that the cathodes of multivibrator tubes 54 and 56 are connected with a negative potential source and the anodes of these tube are connected with datum ground potential. Since the grid 76 is always made conductive on the peaks of the gating pulse, a desirable limiting action will occur to cause the gating waveform appearing at grid 76 to have very sharp edges and a clean flat top. Without this limiting action of the grid 76, capacitive effects would cause the waveform 58 to appear rather rounded and poorly defined at the grid 76. The value of the bias across resistor 114 is of course made sufficiently negative to maintain the tube 72 at plate current cut-off in the absence of the gating pulse 58 so that an output will appear at the anode 80 only at the peak of the gating pulse. It is further found that an additional D. C. bias will be developed across the resistor 112 in an amount proportional to the grid current therethrough. This additional grid bias of course maintains the average negative bias value of the grid 76 relative to datum ground at the peak to peak amplitude of the gating pulse 58.

One of the advantages of the particular arrangement of the present invention shown in the drawing is realized when it is considered that during grid current conduction of the tube 72, the grid-cathode impedance of the tube becomes rather low and not only imposes a load across the gating multivibrator but also across the output of the television signal receiver by way of capacitor 74. Examination will show that the effective increase in load across the television signal receiver during grid conduction is percentage wise much greater than the effective increase in load on the gating multivibrator.

The degree to which the load on the television signal receiver appears to increase percentage wise over the increase in load on the multivibrator, is a positive function of the ratio of intelligence signal voltage appearing at the output of the television receiver and applied to the grid 76 to the peak to peak amplitude of the gating pulse 58. Thus the less grid current that the grid 76 is made to draw the less load there will be on the television signal receiver 10. This is extremely important since circuit load on the television signal receiver will tend to reduce the amplitude of the intelligence signal delivered to the gated amplifier so that the burst component will appear reduced at the output of the triode 72. By supplying some negative voltage across the resistor 114 in accordance with the present invention the amount of grid current required to be drawn by the grid 76 is reduced and the intelligence signal output of the triode 72 is thereby increased due to reduced loading of the television signal receiver.

Another aspect of the present invention shown in the embodiment illustrated in the drawing resides in the automatic compensating action provided for small variations in the amplitude of the gating pulse 58. Should, for example, the mutual conductance of the multivibrator tube 56 be increased due to replacement by another tube having a higher $G_m$ there would result an increase in the amplitude of the gating pulse 58. Unless some compensation is made this increased amplitude of gating pulse will cause a greater grid current to flow in the triode 72 and increase the loading on the television signal receiver 10. The present invention provides means for automatically adjusting the value of the fixed bias on the control electrode of the gated tube in accordance with the amplitude of the applied pulse. This is accomplished in the drawing by means of passing at least a portion of the anode current of the multivibrator tube 56 through the resistance 114. Thus the higher $G_m$ tube will produce a greater current through the resistance 114 and result in an appropriate increase in negative bias on the grid 76 and compensate for the increase in gating pulse amplitude.

It is noted that in the cascade gated amplifier arrangement of the drawing the grid 93 of the right-hand triode is provided with a gating circuit embodying the principles of the present invention. D. C. voltage division occurs through the resistances 120 and 116 comparable to resistances 118 and 114 for the left-hand triode. The gating pulse is capacitively coupled to the upper extremity of resistance 116 via capacitors 122 and 152. Intelligence signal is applied to the grid 93 of the right-hand triode by means of the capacitor 88.

Having considered the sampling action and circuitry provided by the present invention it will be useful to briefly treat the operation of the remaining part of the color television multiplexing oscillator synchronizing arrangement. Accordingly, there will appear at the anode 80 of the triode 72 a waveform substantially as that indicated at 124. This represents the initial sampling of the back porch of the television horizontal synchronizing pulses and includes evidence of the burst component. Due to the rather high "Q" of the circuit 108 it is apparent that it takes some time for the 3.58 sinusoidal component to develop. Correspondingly, it takes some time after the occurrence of the keying pulse 58 before the sinusoidal variation to the tank circuit 108 has completely died out. The triode 92 in turn samples the output of the triode 78 so as to give an even cleaner burst wave form indicated by way of example at 126. As described above, since the signal appearing across the inductance 98 is a push-pull signal with respect to ground the burst component 126 is applied to the double diode 128 in typical frequency comparison fashion. The output of the oscillator 18 is of course fed to the center tap 130 of resistor 132 connected between the anode of one and cathode of the other of the two diodes. The diodes are isolated from the D. C. appearing on the inductance 98 by means of capacitors 134 and 136. The cathode of the one and the anode of the other of the diodes are connected together and also to the low pass filter formed by resistor 138, capacitor 140 and resistors 142. As described in the above referenced pamphlet "A Simplified Receiver for the RCA Color Television System," the D. C. voltage appearing at the right-hand terminal of resistor 142 may be used to control the reactance tube 144 which in turn adjusts the frequency of the oscillator 18 so that it corresponds with the frequency of the received burst.

From the foregoing can be seen that the applicant has provided a new and useful arrangement for operating gated type amplifiers and is especially useful in the provision of a simple and economical gated type amplifier of the triode variety in which both the signal to be gated and the gating control signal are applied to the control electrode of the triode amplifier. It is to be understood, however, that although the present invention has been described in connection with triode type electron discharge tubes its principles of operation are equally applicable to other types of discharge tubes. It is further to be understood that the automatic regulatory action for the gating pulse described above is useful apart from its particular application to gated type amplifiers of the type described.

Having thus described my invention what I claim is:

1. In an electrically gated discharge tube circuit the combination of, a gate signal supply terminal adapted to receive gating signals of predetermined duration relative to a voltage datum, an electron discharge tube having at least an anode, cathode and control electrode, said cathode being coupled with said voltage datum, an output and polarizing circuit connected between said discharge tube anode and cathode, a resistance connected across said gate signal supply terminal and the voltage datum, an impedance connected from a point on said resistance to said discharge tube control electrode, and a capacitor connected in shunt with at least a portion of said resistance residing between said gate supply terminal and said discharge tube control electrode.

2. Apparatus according to claim 1 wherein there is additionally provided means for biasing said gate signal supply terminal at a negative direct current potential with respect to the voltage datum, the value of said bias being such as to render said discharge tube at anode current cutoff only during the absence of gating signal, and means for additionally applying intelligence signal between the control electrode and cathode of said discharge tube.

3. In an electron tube circuit, the combination of, a signal supply terminal designated to deliver a control signal by executing voltage excursions in a negative direction with respect to a voltage datum terminal, the signal thereby having positive and negative going peaks, the positive going peaks attaining a potential closer to said datum than said negative going peaks, an electron discharge tube having at least an anode, cathode and control electrode with a load circuit connected between said anode and cathode, means responsive to the negative peaks of said control signal to develop a bias voltage, means for superimposing the positive peaks of said control signal on top of said bias voltage to form a composite signal, and means for applying said composite signal between the control electrode and cathode of said discharge tube.

4. Apparatus according to claim 3 wherein there is additionally provided means for negatively biasing said control electrode relative to cathode to the point of anode current cutoff and wherein the value of said firstly developed bias added to the level of said control signal positive peaks is sufficient to overcome said last mentioned bias and produce conduction in said discharge tube.

5. In an electron tube circuit, the combination of, a signal supply terminal designated to deliver a control signal by executing voltage excursions in a negative direction with respect to a voltage datum terminal, the signal thereby having positive and negative going peaks, the positive going peaks attaining a potential closer to said datum than said negative going peaks, an electron discharge tube having at least an anode, cathode and control electrode with a load circuit connected between said anode and cathode, means responsive to the negative peaks of said control signal to develop a bias voltage, means for additively superimposing the positive peaks of said control signal on top of said bias voltage to form a composite signal, and means for applying said composite signal between the control electrode and cathode of said discharge tube.

6. In an electron tube signal gating circuit the combination of, a signal supply terminal designated to deliver a control signal by executing voltage excursions in a negative direction with respect to a voltage datum terminal, the signal thereby having positive and negative going peaks, the positive going peaks attaining a potential closer to said datum than said negative going peaks, an electron discharge tube having at least an anode, cathode and control electrode with a load circuit connected between said anode and cathode, a capacitor and a resistance connected in series between said signal supply terminal and said control electrode, means for charging said capacitor in accordance with the negative extremities of the control signal whereby to boost the positive going extremities of said control signal relative to said datum as applied to said control electrode, biasing means for said control electrode for biasing said discharge tube to anode-current cutoff except during the boosted positive extremities of said control signal and means for additionally applying an intelligence signal to be gated between the control electrode and cathode of said discharge tube.

7. Apparatus according to claim 6 wherein said control signal is of pulse formation of which the negative extremities are of longer duration than the positive extremities.

8. Apparatus according to claim 6 wherein there is additionally provided means for rendering the value of bias produced by said biasing means a positive function of the amplitude of said control signal whereby to render control electrode current substantially independent of small variations in the amplitude of control signal.

9. In a gated amplifier circuit the combination of, a supply terminal for intelligence signals that are to be gated, a supply terminal for gating pulses having positive and negative going extremities relative to a potential datum, an electron discharge tube amplifier having a cathode, anode and control electrode, said cathode being connected with said datum, an output and polarizing circuit connected between said anode and cathode, means for applying said gating pulses to said control electrode, biasing means connected between said control electrode and datum for biasing said discharge tube to anode current cutoff by a cutoff bias value sufficient to permit only positive going peaks of said gating pulses to drive said control electrode positive relative to said cathode to produce control electrode current flow, means responsive to said gating pulses for controlling the value of said cutoff bias in accordance with the amplitude of said gating pulses whereby to maintain constant the average control electrode current regardless of small variations in gating pulse amplitude, and coupling means connected with said intelligence signal supply terminal for applying intelligence signal to said control electrode.

10. In a gated amplifier circuit the combination of, a supply terminal for intelligence signals that are to be gated, a supply terminal for gating pulses having positive and negative going extremities relative to a potential datum, an electron discharge tube amplifier having a cathode, anode and control electrode, said cathode being connected with said datum, an output and polarizing circuit connected between said anode and cathode, a first resistance connected from said gating supply terminal to said control electrode, a second resistance connected from a point on said first resistance to the potential datum, a capacitor connected in shunt with at least a portion of said first resistance residing between said second resistance and said gating supply terminal, and means for capacitively coupling said intelligence signal supply terminal with said control electrode.

11. Apparatus according to claim 10 wherein said gating supply terminal comprises a direct galvanic connection to the anode of a second electron discharge tube having its anode connected with the datum potential through only a resistance, with means for establishing the second discharge tube cathode at a negative potential relative to the datum and means for applying gating signal producing waveforms to the control electrode of said discharge tube.

EUGENE O. KEIZER.

REFERENCES CITED

The following references are of record in the file of this patent:

UNITED STATES PATENTS

| Number | Name | Date |
| --- | --- | --- |
| 2,537,065 | Lester et al. | Jan. 9, 1951 |